(12) United States Patent
Ikeda et al.

(10) Patent No.: US 6,643,041 B1
(45) Date of Patent: Nov. 4, 2003

(54) OPTICAL NETWORK

(75) Inventors: Hiroki Ikeda, Hachioji (JP); Tatsuo Kanetake, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/345,747

(22) Filed: Jul. 1, 1999

(30) Foreign Application Priority Data

Jul. 1, 1998 (JP) .......................................... 10-185518

(51) Int. Cl.$^7$ .............................................. H04B 10/20
(52) U.S. Cl. ...................... 359/124; 359/110; 359/119
(58) Field of Search ............................. 359/110, 123, 359/124, 128, 135, 180, 119

(56) References Cited

U.S. PATENT DOCUMENTS

| | | | |
|---|---|---|---|
| 5,069,521 A | * 12/1991 | Hardwick ..................... | 385/24 |
| 5,532,862 A | * 7/1996 | Tada et al. ................... | 359/161 |
| 5,550,805 A | * 8/1996 | Takatori et al. ............ | 370/16.1 |
| 5,978,354 A | * 11/1999 | Taketomi et al. ........... | 370/226 |
| 5,999,288 A | * 12/1999 | Ellinas et al. ................ | 359/119 |
| 6,047,331 A | * 4/2000 | Medard et al. .............. | 709/239 |
| 6,137,603 A | * 10/2000 | Henmi ........................ | 359/110 |
| 6,144,633 A | * 11/2000 | Ikeda et al. .................. | 370/217 |
| 6,366,556 B1 | * 4/2002 | Ballintine et al. .......... | 370/216 |

OTHER PUBLICATIONS

Fiber Network Service Survivability, p. 109–121, 1992 Artech House, Inc.*
Bellcore SONET BLSR Generric Criteria GR–1230–CORE, 1993.*
Nested Protection Switching, Ellison, Jul. 18, 1990, ITU T1X1.5/90–132.*

* cited by examiner

Primary Examiner—Brent A. Swarthout
(74) Attorney, Agent, or Firm—Antonelli, Terry, Stout & Kraus, LLP

(57) ABSTRACT

A first object of the invention of the present application is to provide an optical network capable of flexibly performing a choice of protection optical paths upon the occurrence of a failure without depending on an installation form of an optical transmission line, e.g., an optical fiber. A second object of the invention of the present application is to allow an improvement in the efficiency of use of an optical transmission line, e.g., an optical fiber employed in an optical network. The invention of the present application provides a wavelength division multiplexing transmission optical network having at least a plurality of pieces of transmission equipment and a plurality of optical paths connecting the transmission equipment and wherein wavelengths of predetermined transmission light are assigned to the optical paths and a transmission frame having overhead information is at least used to perform digital transmission.

28 Claims, 10 Drawing Sheets

FIG. 4

K1 BYTE

| PRIORITY (BIT 1-4) | | WORKING OPTICAL PATH ID (BIT 5-8) | |
|---|---|---|---|
| 1111 | SIGNAL FAILURE OF PROTECTION OPTICAL PATH | 1111 | WORKING OPTICAL PATH#15 |
| 1110 | FORCED SWITCH | ------ | ------ |
| 1101 | FORCE SWITCH PROTECTING SIGNAL DEGARADE | 0001 | WORKING OPTICAL PATH#1 |
| 1100 | SIGNAL FAILURE | 0000 | PROTECTION OPTICAL PATH#0 |
| 1011 | SIGNAL FAILURE PROTECTING | | |
| 1010 | SIGNAL DEGRADE | | |
| 1001 | SIGNAL DEGRADE | | |
| | SIGNAL FAILURE REJECTION PROTECTING SIGNAL DEGARADE | | |
| 1000 | MANUAL SWITCH | | |
| 0110 | WAIT-TO-RESTORE | | |
| 0000 | NO REQUEST | | |

K2 BYTE

| SOURCE NODE ID (BIT 1-4) | | TRIGGER (BIT 5) | | STATUS (BIT 6-8) | |
|---|---|---|---|---|---|
| 1111 | NODE#16 | 1 | ON | 111 | AIS |
| ------ | ------ | 0 | OFF | 110 | RDI |
| 0000 | NODE#1 | | | 011 | BRIDGED AND SWITCHED |
| | | | | 010 | BRIDGED |
| | | | | 000 | IDLE |

TO TRANSMISSION EQUIPMENT

| OPTICAL PATH ID | CONNECTION | STATE | FIRST PRIORITY PROTECTION OPTICAL PATH | | SECOND PRIORITY PROTECTION OPTICAL PATH | |
|---|---|---|---|---|---|---|
| 1 | AB | NORMAL | AB | AVAILABLE | ADCB | AVAILABLE |
| 2 | BC | NORMAL | BC | AVAILABLE | BADC | AVAILABLE |
| 1 | AD | NORMAL | AD | AVAILABLE | ABCD | AVAILABLE |
| 1 | AC | NORMAL | ADC | AVAILABLE | ABC | AVAILABLE |

WAVELENGTH ADDRESS MAP

FIG. 11

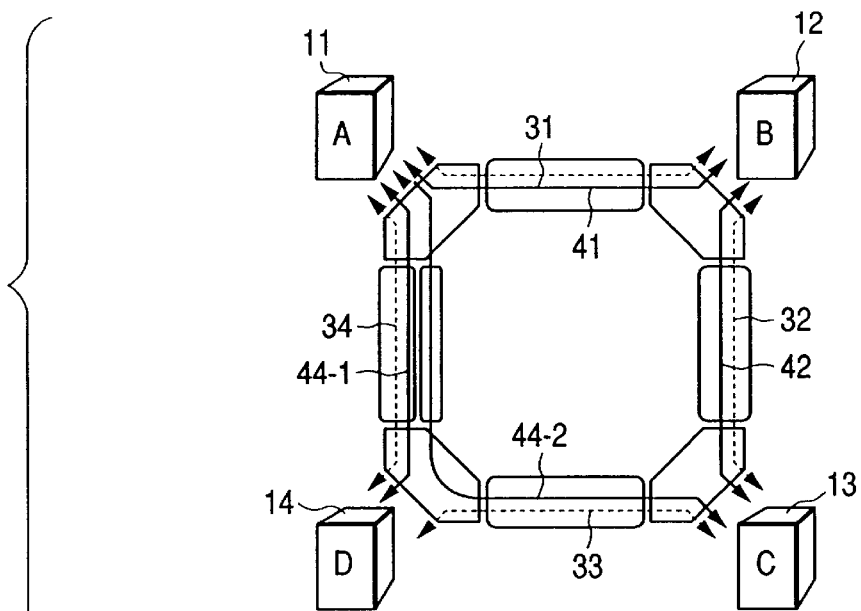

| OPTICAL PATH ID | CONNECTION | STATE | FIRST PRIORITY PROTECTION OPTICAL PATH | | SECOND PRIORITY PROTECTION OPTICAL PATH | |
|---|---|---|---|---|---|---|
| 1 | AB | NORMAL | AB | AVAILABLE | ADCB | AVAILABLE |
| 2 | BC | NORMAL | BC | AVAILABLE | BADC | AVAILABLE |
| 1 | AD | NORMAL | AD | AVAILABLE | ABCD | AVAILABLE |
| 1 | AC | NORMAL | ADC | AVAILABLE | ABC | AVAILABLE |

WAVELENGTH ADDRESS MAP (BEFORE THE SIGNAL FAILURE OCCURS)

| OPTICAL PATH ID | CONNECTION | STATE | FIRST PRIORITY PROTECTION OPTICAL PATH | | SECOND PRIORITY PROTECTION OPTICAL PATH | |
|---|---|---|---|---|---|---|
| 1 | AB | SIGNAL FAILURE | AB | OCCUPIED | ADCB | AVAILABLE |
| 2 | BC | NORMAL | BC | AVAILABLE | BADC | NA |
| 1 | AD | NORMAL | AD | AVAILABLE | ABCD | NA |
| 1 | AC | NORMAL | ADC | AVAILABLE | ABC | NA |

NA : NOT AVAILABLE

WAVELENGTH ADDRESS MAP (AFTER THE SIGNAL FAILURE OCCURS)

OPTICAL NETWORK

BACKGROUND OF THE INVENTION

1. Field of the Invention

The present invention relates to an optical network. Particularly, the present invention relates to an optical network using a wavelength-division multiplexing transmission system or a time-division multiplexing transmission system.

2. Description of the Related Art

In order to improve the reliability of circuit service, a network has recently been proposed which is capable of healing a signal of a failure developed in an optical network. The circuit failure includes an unintentional cutoff of a transmission line, signal degradation, repeater's trouble, etc. This type of optical network is normally designed so as to automatically detect the circuit failure and automatically perform switching between transmission lines. Such an optical network is called "survival network".

There is also provided a survival network capable of performing switching to an SDH system or a SONET system corresponding to a synchronous network in particular to improve the healing capability of such a transmission network. The SDH system is an abbreviation of the Synchronous Digital Hierarchy System. Further, the SONET system is short for the Synchronous Optical Network.

As examples of its use, there are known (1) a 1:N type NPS (Nested Protection Switching) system which performs switching between a plurality of working lines and a plurality of protection lines, (2) a 4Fiber type BLSR (Bidirectional Line Switching Ring) system connected in a ring form by working lines and protection lines, etc.

The former example is described in, for example, Fiber Network Service Survivability, 1992 Artech House, INC, and T1X1.5/90-132. The latter example is described in Bellcore SONET BLSR Genertic Criteria GR-1230-CORE, 1993.

FIG. 2 is a diagram for describing the 1:N type NPS system. In FIG. 2, reference numerals 101 through 104 indicate transmission equipment respectively. Working lines 105 through 108 indicate bidirectional lines respectively. The bidirectional lines described herein are formed by two optical fibers. In FIG. 2, the bidirectional lines are shown by arrows indicated by bidirectional solid lines corresponding to respective one reference numerals.

The example shown in FIG. 2 has the following connections. The working line 105 is connected to terminating equipment 112 lying in the transmission equipment 101 and an add-drop multiplexer (branch-insertion equipment) lying in the transmission equipment 102. The line is connected to the terminating equipment or add-drop multiplexer by using an optical transmitter on the transmitting side and using an optical receiver on the receiving side. Further, the working line 105 is connected to the working line 106 through the add-drop multiplexer lying in the transmission equipment 102. The working line 107 is connected to the transmission equipment 102 and terminating equipment lying in the transmission equipment 104. The working line 107 is relayed by the transmission equipment 103. Reference numeral 113 indicates a repeater. Namely, the transmission equipment 103 does not have the ability to switch the bidirectional line 107 to a protection line. On the other hand, protection lines 109 through 111 are indicated by dotted lines in FIG. 2 respectively. The protection lines 109 through 111 connect all the transmission equipment 101 through 104 to one another through the use of the add-drop multiplexers within the respective transmission equipment. The respective transmission equipment have the ability to switch the working lines to the protection lines, respectively.

An example of switching to be done by the NPS system will next be described. A description will be made of how to perform switching when a failure occurs in the bidirectional line 107, for instance. Since the bidirectional line 107 is terminated by the transmission equipment 102 and the transmission equipment 104, these transmission equipment respectively have the ability to perform line switching. Therefore, when the failure occurs in the bidirectional line 107, the transmission of a signal is done using the protection line 110 and the protection line 111. The 1:N type NPS system shown in FIG. 2 lays or strings the working lines according to the capacity of a traffic (main signal) and can select the corresponding add-drop multiplexer or repeater within each transmission equipment.

FIG. 3 is a diagram for describing the 4Fiber type BLSR system. In FIG. 3, reference numerals 201 through 204 indicate transmission equipment respectively. Working lines 221 through 224 and protection lines 211 through 214 are respectively connected to one another in a ring form through add-drop multiplexers within the transmission equipment. The respective transmission equipment have the ability to switch the working lines to the protection lines, respectively.

A description will be made of a basic operation of the 4Fiber type BLSR system, which is related to line switching for a circuit failure. When a failure occurs in the working line 221 in FIG. 3, the transmission equipment 201 and 202 perform bidirectional line switching and thereby heals a signal through the use of the protection line 211. When failures occur in both the working line 221 and the protection line 211, i.e., failures such as a cable cut, etc. occur, a diverse route characterized by the ring type network is utilized. Namely, the 4Fiber type BLSR system performs line switching by means of the transmission equipment 201 and 202 to thereby allow the healing of a signal through the use of the protection lines 212 through 214. The method of healing the signal by the ring type in this way is characterized in that two clockwise and counterclockwise routes can be selected. The present 4Fiber BLSR system is provided by GR-1230-CORE.

SUMMARY OF THE INVENTION

The conventional survival network performs line switching to heal a traffic with a view toward healing failures such as a cable cut, cutting-off of an optical fiber and a breakdown in optical transmit-receive unit, etc.

However, the above-described 1:N NPS system needs an optical fiber according to the demand for traffics. However, when the number of optical fibers is insufficient, the system needs to additionally increase optical fibers between transmission equipment and thereby involves great installation cost.

The above-described BLSR system has the following drawbacks. Since the BLSR is of a 1:1 system, protection lines corresponding to transmission capacity of working lines must be installed. Accordingly, the capacity of the maximum traffic, which is necessary for an optical span, results in the total capacity of the ring. When only a traffic between the transmission equipment 201 and 202 takes the maximum capacitance value in the network in FIG. 3, for example, the entire ring must be set to the maximum capacitance value as well as to the maximum capacitance value of the working line 221. Namely, as the traffic concentrates on a given span in the ring, a problem occurs in use efficiency and economy.

Since the survival network needs the optical fibers corresponding to the transmission capacity due to fueling of an additional demand as described above, the cost of increasing the optical fibers and the efficiency of use of each optical fiber turn into problems.

The invention of the present application has been made to solve the above-described various problems.

A first object of the invention of the present application is to provide an optical network capable of flexibly selecting protection optical paths upon the occurrence of a failure without depending on the form of installation of an optical transmission line, e.g., an optical fiber.

A second object of the invention of the present application is to improve the efficiency of use of an optical transmission line, e.g., an optical fiber employed in an optical network.

A summary of a basic form of the invention of the present application will be briefly described. Summaries of respective various forms of the present invention disclosed in the specification of the present application will next be explained.

<Summary of Configuration of Optical Network According To the Invention of the Present Application>

A typical optical network according to the invention of the present application is an optical network having at least a plurality of pieces of transmission equipment, and a plurality of optical paths connecting the plurality of pieces of transmission equipment and wherein wavelengths of predetermined transmission light are assigned to the optical paths to perform wavelength-division multiplexing digital transmission, and the plurality of optical paths include optical paths which connect the plurality of pieces of transmission equipment in a straight chain form.

More specific configurations of optical networks according to the inventions of the present application will further be illustrated by way of example as follows. These various inventions of the present application can provide so-called self-healing optical networks.

There is provided a wavelength division multiplexing transmission optical network having at least a plurality of pieces of transmission equipment, and a plurality of optical paths which connect the plurality of pieces of transmission equipment and wherein the plurality of optical paths are assigned wavelengths of predetermined transmission light and at least a transmission frame having overhead information or an overhead is used to perform digital transmission, and the plurality of optical paths include optical paths which connect the plurality of pieces of transmission equipment in a straight chain form.

Namely, the essential point of the wavelength division multiplexing transmission optical network resides in that the optical paths connected in the straight chain form are constructed so as to be available as protection optical paths. Thus, when a failure occurs in so-called mesh-like working optical paths, they can be healed with the protection optical paths. The optical network according to the invention of the present application can provide a so-called self-healing optical network.

The invention of the present application can be applied to both a wavelength division multiplexing transmission system and a time-division multiplex transmission system.

An optical path of light allocated according to the selection of a wavelength or time division, is called [optical path]. Namely, a logical connecting path for a lightwave signal corresponds to the [optical path]. On other hand, a physical connecting path constituting the optical path specifically is called [optical transmission line]. Described specifically, for example, an optical fiber is a typical example. Accordingly, a plurality of optical paths can exist in one optical transmission line, for example. Namely, when the respective optical paths depend on the assignment of wavelengths, this communication system is normally called "wavelength division multiplexind transmission". When the respective optical paths are allocated according to the time division, this communication system is normally called "time division multiplexing".

Incidentally, the overhead held by the transmission frame indicates a region in which operation and maintenance information of the network are transferred. An automatic switching byte in the overhead is used to indicate both the transfer of a signal for controlling system switching between transmission terminals and alarm status with respect to breakdowns in a repeater and transmission equipment in a transmission system, and alarm status.

Switching control information about a failure, failure information of respective optical paths, wavelength address information, etc. lying in the automatic switching byte are needed for the purpose of the selection of the optical paths. While the transmission equipment are capable of performing digital transmission by at least using the transmission frame having the overhead, they have memory means which constitute wavelength address maps for storing therein at least optical multiplex information of the respective optical paths, e.g., the wavelength address information, and the failure information of the respective optical paths. In the case of the time division multiplex, the respective optical multiplex information result in time-division address information.

When a failure occurs in a working optical path, the switching control information about the failure and the wavelength address information are transferred or communicated between the transmission equipment based on information about the automatic switching byte in the overhead of the transmission frame, so that the corresponding optical path is switched over to another based on the switching information, the wavelength address information and the failure information. Incidentally, these specific examples will be described in the section of embodiments of the invention.

In the optical network, the optical paths can be divided into the working optical path and the protection optical path according to its logical connections. In the present optical network, however, the respective optical paths themselves can play both working and protection roles according to instructions from the respective transmission equipment. The working optical path is an optical path for transmitting a desired signal, whereas the protection optical path may be considered to be a name of an optical path used when some failure occurs in each optical path.

The invention of the present application is extremely useful for application to the typified SONET or SDH network known heretofore as the basic configuration of the optical network. In the SONET or SDH network, the byte for automatic switching is called "APS (Automatic Protection Switching) byte" and normally comprises two regions of K1 and K2. The details of the APS byte will be described later.

Summaries of various forms of the invention of the present application, which are disclosed in the specification of the present application, will next be listed.

A basic idea of an optical network according to the present invention is that when a failure occurs in a working optical path, switching information including wavelength address information is communicated between transmission equipment and a signal is healed through the use of a protection optical path. However, the following forms are considered as optical networks for facilitating the forms thereof and performing switching at high speed and with ease. (1) The optical network has at least protection optical paths which connect the transmission equipment in a ring form. (2) The optical network has at least protection optical paths which connect the transmission equipment in a straight chain form. (3) The optical network includes at least two or more optical paths per optical transmission line. This form improves the efficiency of use of an optical fiber and enhances flexibility without depending on a physical form such as the optical fiber or the like. (4) As an optical network form of the present invention, the optical network of the present application may include at least two or more ring networks constructed by the working optical paths. (5) The basic operation of the wavelength division multiplexing optical network according to the invention of the present application is summarized as follows: The wavelength division multiplexing optical network according to the invention of the present application is a wavelength division multiplexing survival network having a plurality of pieces of transmission equipment, and optical paths which connect the plurality of pieces of transmission equipment and are assigned optical wavelengths and wherein at least a transmission frame having an overhead is used to perform digital transmission. Each of the transmission equipment has memory means constituting a wavelength address map for storing therein at least wavelength address a information of each optical path and failure information of each optical path. When a failure occurs in the working optical path, switching control information about the failure and wavelength address information are communicated between the transmission equipment based on an automatic protection switching byte lying in the overhead of the transmission frame, so that the faulty working optical path is switched over to the proper optical path based on the switching information, the wavelength address information and the failure information.

When the working optical paths and protection paths as optical paths are logically connected the transmission equipment to each other, the wavelength division multiplexing survival network can be constructed so that the working optical paths are respectively switched over to the protection optical paths based on the switching information, the wavelength address information and the failure information.

(6) There is provided the wavelength division multiplexing survival network as described in the items (1) through (5) wherein the above-described wavelength division multiplexing survival network includes at least two or more optical paths per optical transmission line.

(7) There is provided the wavelength division multiplexing survival network as described in the items (1) through (6) wherein the switching information includes at least wavelength addresses for working optical paths and switched states of transmission equipment.

(8) There is provided the wavelength division multiplexing survival network as described in the items (1) through (7) wherein the switching information includes at least wavelength addresses for working optical paths highest in importance and switching states of transmission equipment.

(9) There is provided the wavelength division multiplexing survival network as described in the items (1) through (7) wherein the switching information includes at least numbers of working optical paths highest in importance, numbers of transmission equipment which transmitted the switching information, and switched states of the transmission equipment.

(10) There is provided the wavelength division multiplexing survival network as described in the items (1) through (7) wherein the above-described wavelength division multiplexing survival network includes at least two or more ring networks constructed by the working optical paths.

(11) There is provided an optical network, comprising at least: a plurality of pieces of transmission equipment; and a plurality of optical paths which connect said plurality of pieces of transmission equipment to one another; wherein said optical paths are used as working optical paths or protection optical paths, and wavelengths of predetermined transmission light are assigned to said optical paths to perform wavelength division multiplexing digital transmission, and said plurality of optical paths have optical paths which connect said plurality of pieces of transmission equipment in a straight chain form.

(12) Furthermore, there is provided the optical network according to item (11), further including at least optical paths connecting said transmission equipment in a ring form and wherein said optical paths are capable of being used as protection optical paths.

(13) Furthermore there is provided the optical network according to item (11), further including at least optical paths connecting said transmission equipment in a straight chain form, and wherein said optical paths are capable of being used as protection optical paths.

(14) Furthermore there is provided the optical network according to item (12), wherein said optical paths connect a plurality of said transmission equipment in form of mesh-like and said optical paths are served as a working line.

(15) Furthermore there is provided the optical network according to item (13), wherein said optical paths connect plurality of said transmission equipments in form of mesh-like and said optical paths are served as a working line.

(16) There is provided a time-division multiplex transmission optical network, comprising at least: a plurality of pieces of transmission equipment; and a plurality of optical paths which connect said plurality of pieces of transmission equipment to one another, wherein said optical paths are used as working optical paths or protection optical paths, and said plurality of optical paths are assigned predetermined time division multiplex signals and at least a transmission frame having overhead information is used to perform digital transmission, and said plurality of optical paths include optical paths which connect said plurality of pieces of transmission equipment in a straight chain form.

(17) Furthermore there is provided the optical network according to item (16), further including at least optical paths connecting said plurality of pieces of transmission equipment in a ring form, and wherein said optical paths are capable of being used as protection optical paths.

(18) Furthermore there is provided the optical network according to item (16), further including at least optical paths connecting said plurality of pieces of transmission equipment in a straight chain form, and wherein said optical paths are capable of being used as protection optical paths.

(19) Furthermore there is provided the optical network according to item (17), wherein said optical paths connect plurality of said transmission equipments in form of mesh-like and said optical paths are served as a working line.

(20) Furthermore there is provided the optical network according to item (18), wherein said optical paths connect plurality of said transmission equipments in form of mesh-like and said optical paths are served as a working line.

The feature, the optical paths connect plurality of said transmission equipments in form of mesh-like and said optical paths are served as a working line, is more useful for many other modes of the present invention.

<Typical Example of Switching Determining Steps of Optical Network According to the Invention of the Present Application>

A network for implementing communications in switching information in an optical network of the present invention is as follows:

There is provided a wavelength division multiplexing survival network having at least several pieces of transmission equipment, working optical paths which connect the transmission equipment to one another and are assigned optical wavelengths, and protection optical paths which connect the transmission equipment to one another and are assigned optical wavelengths and wherein each of the transmission equipment has memory means constituting a wavelength address map for storing therein at least information of wavelength addresses and failure information on the respective optical paths, and performs digital transmission by using at least a transmission frame having an overhead, which comprises the following switching determining steps shown by way of example.

(1) Step 1: a step for determining whether an automatic protection switching byte of the overhead shows a failure pattern.

(2) Step 2: a step for determining whether the automatic protection switching byte of the overhead is destined for the transmission equipment which received the same.

(3) Step 3: a step for starting a switching operation when the automatic protection switching byte is destined for the transmission equipment which received the same.

(4) Step 4: a step for transferring the automatic protection switching byte when the automatic protection switching byte is not destined for the transmission equipment which received the same.

<Summary of Transmission Equipment>

The logical configuration of the optical network has centrally been described up to now. A summary of a specific physical configurational example of the logic configuration will next be explained. More specific and practical configurations of such equipment will be described in the section of the embodiments of the invention.

An example of an optical network according to the invention of the present application is shown in FIG. 5. It is needless to say that the invention of the present application is not limited to this example. The wavelength division multiplexing survival network comprises transmission equipment 11 through 14, optical fibers 15 through 18, optical path add-drop multiplexers 21 through 24, protection optical paths 31 through 34, and working optical paths 41, 42, 44-1 and 44-2. In FIG. 5, the optical paths show bidirectional optical paths. Since, however, the same optical fiber is used in the example, the bidirectional optical paths make use of different optical wavelengths.

Each of the transmission equipment is constructed so as to contain the following elements. Reference numeral 9 in FIG. 1 shows this example. It has at least (1) transmit-receive units 5 and 6 for the optical paths, (2) control means 3 for optical transmission, and (3) path switching means or units 4. Further, the control means 3 has a wavelength address map 2 used as memory means for storing wavelength address information about the optical paths and failure information about the optical paths therein, and overhead processing means or units 1. The wavelength division multiplexing survival network is connected in a ring form by the protection optical paths 31 through 34 through optical path add-drop functions. The working optical path 41 is terminated by the transmission equipment 11 and 12.

The respective transmission equipment 11 through 14 have optical transmit-receive units and add-drop functions for the optical paths, respectively. The respective transmission equipment have the ability to perform optical-path switching, based on the functions respectively. This switching is done by the path switching units 4.

The optical path add-drop multiplexer is optical equipment which is comprised principally of a wavelength-division multiplexer (WDM), an optical crossconnect, an optical repeater, an optical filter, an optical switch or optical circulator, etc. This equipment corresponds to a piece of equipment capable of selecting an arbitrary optical wavelength and providing add (Add: insertion), drop (Drop: branch) and through (Through: pass).

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 is a diagram showing an example of a format for an APS byte;

FIG. 11 is a diagram for describing how to use wavelength addresses related to the present invention;

DESCRIPTION OF THE PREFERRED EMBODIMENTS

A basic idea of the present invention provides a wavelength division multiplexing survival network wherein when a failure occurs in a working optical path, switching control information including wavelength addresses is mutually transmitted or communicated between respective transmission equipment and optical-path switching is done based on the switching control information so that a signal transmitted through the working optical path is transmitted through a spare or protection optical path.

Incidentally, paths for a large number of lights transmitted in wavelength-division multiplex form exit within one optical fiber as will be understood from the following specific examples.

The term protection optical paths described in the specification of the present application are optical paths switched upon occurrence of the failure as described above. Namely, the protection optical path is named where a spare or protection role is given thereto and is not intended for an optical path fixedly provided specially as the protection optical path. Thus, when no failure occurs in the working optical path, the protection optical path can be also used to transmit a signal therethrough. Both the working optical path and the protection optical path are the same from the viewpoint of information transmission. In other words, when priorities are assigned to all the working optical paths, the working optical paths given lower priorities can be also called spare or protection optical paths.

Namely, when a failure occurs in a working optical path given a higher priority, a signal for the optical path given the higher priority is relieved or healed using a working optical path given a lower priority. At this time, a signal for the working optical path given the lower priority cannot be transmitted as a matter of course.

Figure 1:
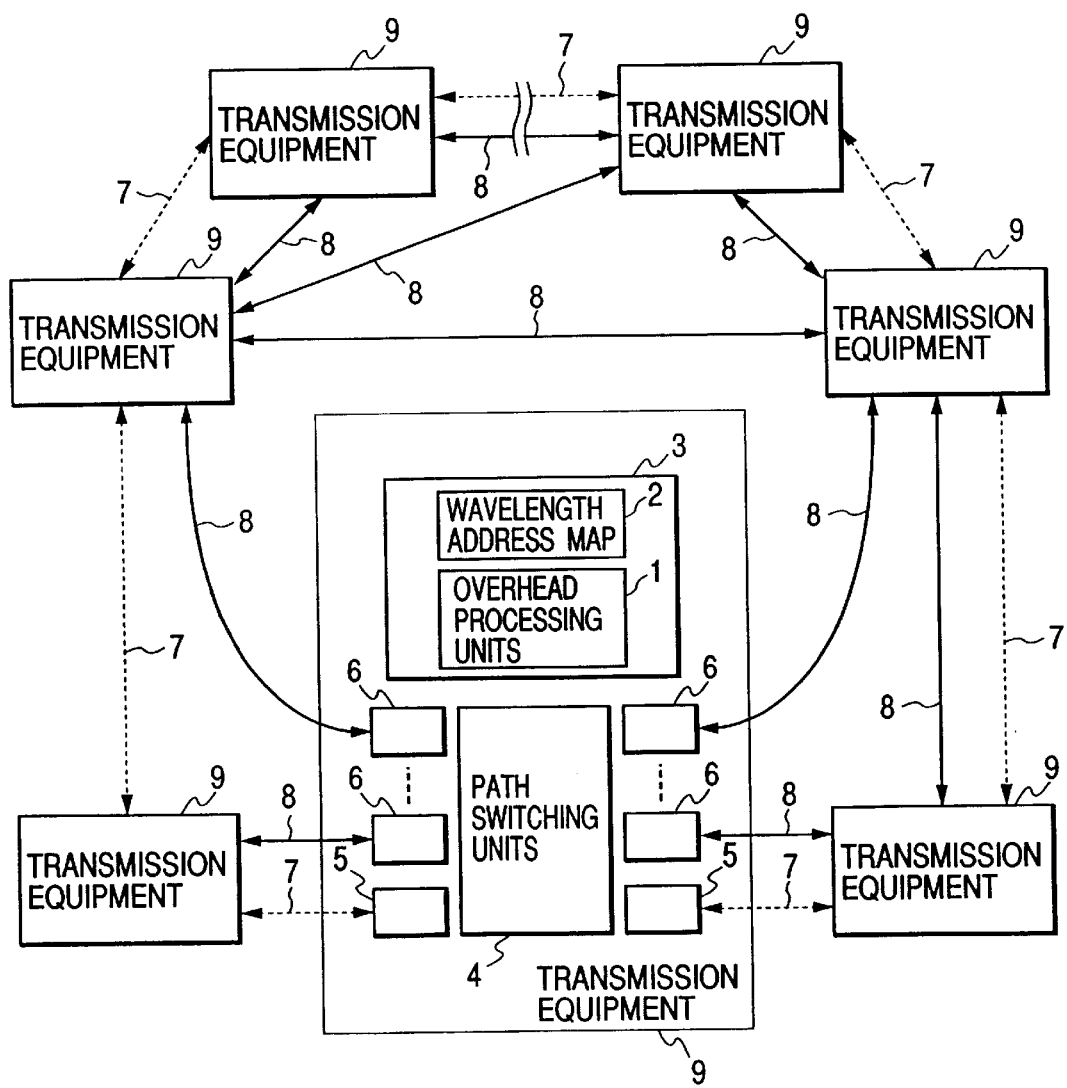
FIG. 1 is a diagram showing a schematic configuration of the present invention.
Figure 2:
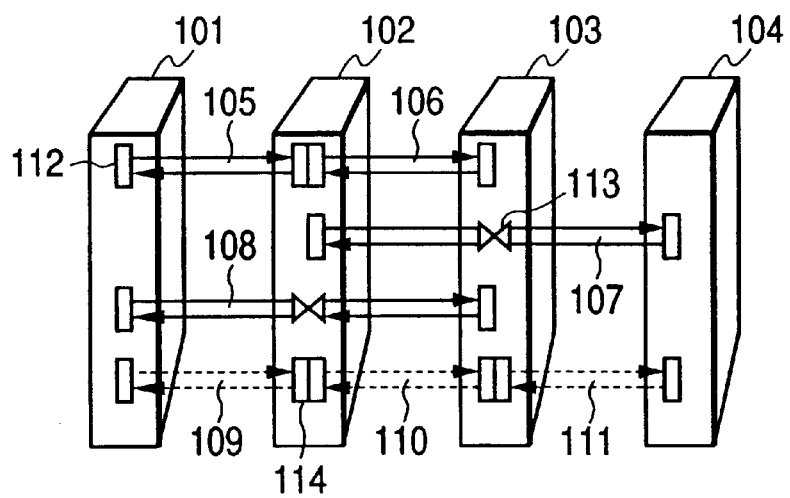
FIG. 2 is a diagram for describing a 1:N type NPS system.
Figure 3:
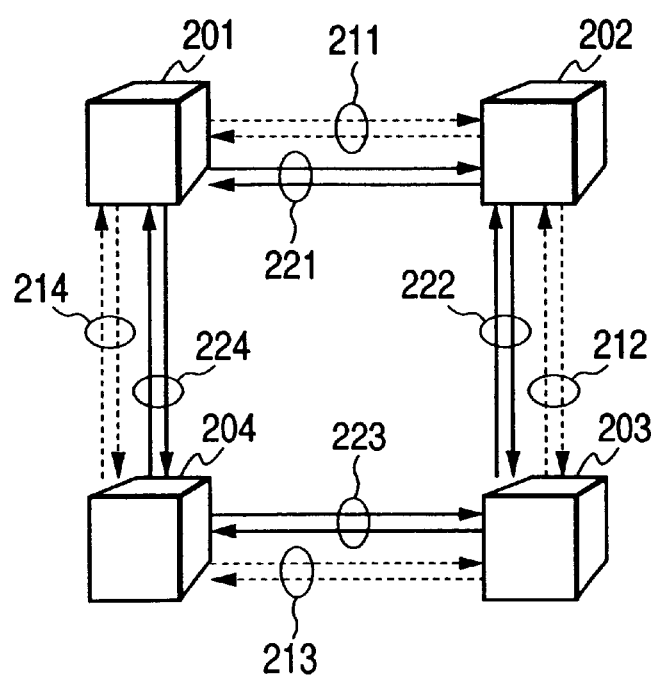
FIG. 3 is a diagram for describing a 4 Fiber type BLSR.

FIG. 1 is a diagram showing a schematic configuration of the present invention. The schematic configuration is one example for describing the principle of a wavelength division multiplexing survival network. The wavelength division multiplexing survival network related to the present invention includes the following elements.

The example shown in FIG. 1 illustrates an optical network comprising seven pieces of transmission equipment 9. The present drawing shows only logical connections of optical paths. The respective transmission equipment 9 are optically connected to one another by optical paths 7 and optical paths 8. In the present example, the optical paths 8 indicated by solid lines are used as working optical paths, whereas the optical paths 7 indicated by dotted lines are used as protection optical paths, respectively.

Each transmission equipment 9 shown as its typical example in FIG. 1 is constructed so as to include the following elements. Namely, the transmission equipment 9 has at least (1) transmit-receive units 5 and 6 for the optical paths, (2) optical-path switching control means 3, and (3) path switching means or units 4. Further, the control means 3 has a wavelength address map 2 used as memory means for storing wavelength address information about the optical paths and failure information about the optical paths therein, and overhead processing means or units 1.

The switching overhead processing means or units 1 normally comprises a CPU (Central Processing Unit). The overhead processing units 1 executes processing for various requests by which overheads have been required of it. Namely, the overhead processing means 1 performs an overhead analysis while referring to switching information within each overhead, detected failure information, information in a wavelength address map storing wavelength address information and the like therein thereby to perform a switching decision or the like.

In the example shown in FIG. 1, the transmit-receive units 6 correspond to transmit-receive units for working optical paths, and the transmit-receive units 5 correspond to transmit-receive units for protection optical paths, respectively. The working optical paths 8 are transmitted and received by the working optical-path transmit-receive units 6 respectively. The protection optical paths 7 are transmitted and received by the protection optical-path transmit-receive units 5 respectively. Further, the optical path transmit-receive units are respectively electrically connected to the path switching means or units 4 for performing switching between main signals. Incidentally, a specific configuration of each transmit-receive unit may be a normally-available one.

Each of signals for the optical paths 7 and 8 has a main signal and an overhead. The details of the configuration of the signal will be described later.

The operation of each transmission equipment at the time that a transmission failure occurs in each optical path, will next be explained.

The optical path transmit-receive units 5 and 6 supervise or monitor their corresponding optical paths 7 and 8. When a transmission failure is detected, they send information about the transmission failure to the overhead processing units 1 lying in the control means 3. Further, the optical path transmit-receive units 5 and 6 receive therein overhead information lying in a frame of a signal transmitted from other transmission equipment and send the same to the overhead processing units 1. The overhead processing units 1 analyzes the overhead information while referring to the switching information lying in each overhead, the detected failure information and the information in the wavelength address map storing the wavelength address information, etc. therein to perform a switching decision, thereby executing processing for the overhead. Namely, the overhead processing units 1 performs a switching decision from switching information about an APS byte lying in an overhead of a received transmission frame and failure information notified from the optical path transmit-receive units 5 and 6 lying in the same node as the processing units. Further, the overhead processing units 1 determines whether a main signal should be switched to a protection optical path by the path switching units 4. At this time, it determines by reference to the wavelength address map storing a connected state of a network and the present state of failure, etc. therein whether the main signal should be switched to the protection optical path. The control means 1 gives a switching instruction to the path switching units 4 based on the result of determination by the path processing units 1. Further, the overhead processing units 1 determines information about an APS byte to be transmitted based on the result of determination by the path processing units 1. Incidentally, the wavelength address map will be described later.

While the automatic protection switching byte employed in the SONET or SDH network has been described above as called APS byte, the present byte normally consists of two regions: K1 and K2. A specific example illustrative of various assignments in the APS byte will be shown in FIG. 4. The K1 and K2 bytes have eight bits respectively. (1) Priorities given to failures and (2) optical path numbers assigned to the working optical paths are assigned to the K1 byte lying in the APS byte. Assigned to the K2 byte are (1) transmission node numbers, (2) on and off of trigger and (3) switched status, i.e., an alarm indication signal (AIS), a far end receive failure (FERF), bridged and switched, bridged, and a normal state. The bridged indicated the completion of the bridging in the node which sent the message, and the bridged and switched indicated the completion of the bridging and switching in the node which sent the message.

Figure 10:
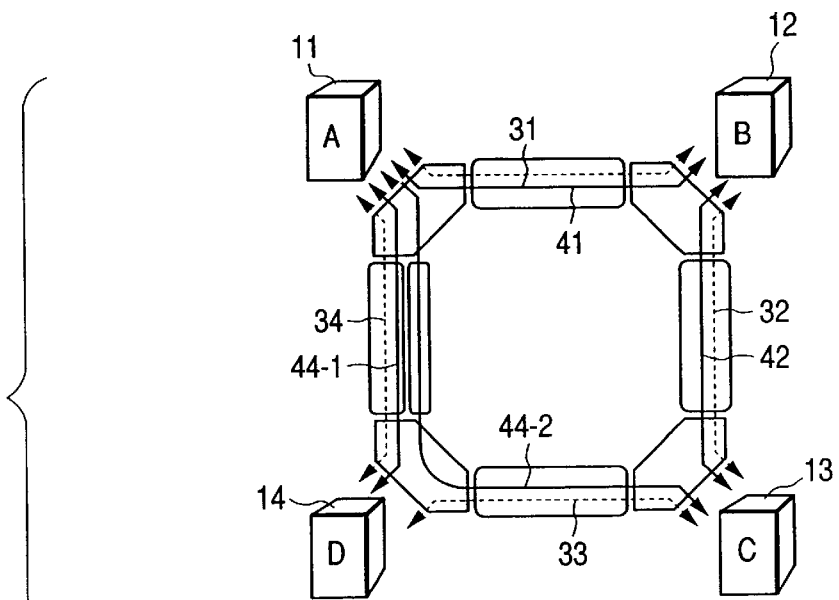
FIG. 10 is a diagram showing an example of the use of a wavelength address map employed in the present invention.

Further, the wavelength address map stores therein (1) optical path numbers, (2) connection nodes, (3) first priority protection optical paths, and (4) second priority protection optical paths. Incidentally, the transmission equipment connected according to the optical paths are designated for the (2) connection nodes. The first and second respective protection optical paths show priorities given to switching to the protection optical paths. An example of the wavelength address map is shown in FIG. 10. Let's now consider an optical path number 1 illustrated in this example. If a connection node AB is taken, it is then intended for connection of a node A and a node B. When a given failure occurs in this transmission path or line, a priority is firstly attached to an optical path AB as a spare or protection optical path and a priority is firstly attached to an optical path ADCB as a spare or protection optical path.

As a result, the overhead processing units 1 sends the processed overhead to the corresponding optical path transmit-receive unit. The overhead processing units 1 dynamically updates data in the wavelength address map, based on the result of processing thereof. Further, the overhead processing units 1 switches a main signal for an optical path to the specified protection optical path, based on these results through the use of the path switching units 4.

Specific various examples illustrative of a method of performing switching between optical paths employed in the entire wavelength division multiplexing survival network will next be explained.

EMBODIMENT 1

Figure 5:
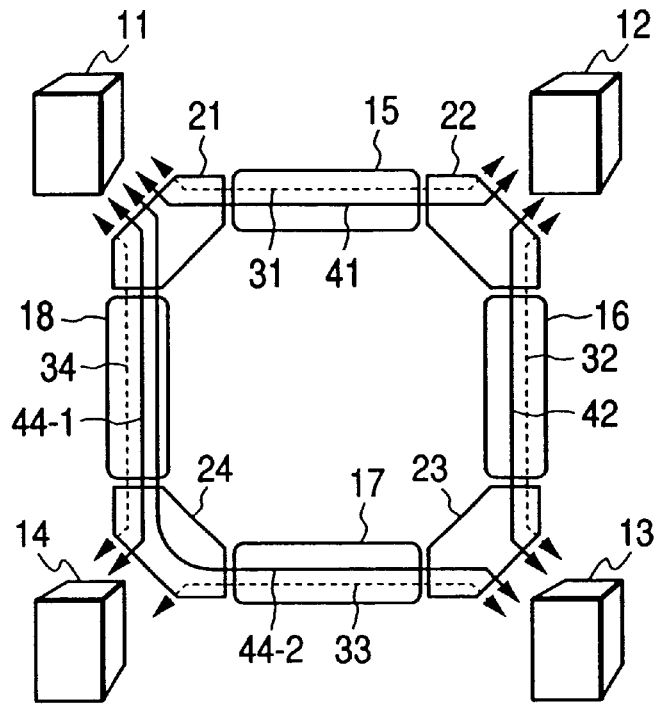
FIG. 5 is a diagram illustrating an example of a wavelength division multiplexing survival network of the present invention.

FIG. 5 is a diagram showing an example of a wavelength division multiplexing survival network of the present invention. This is an example in which respective transmission equipment are connected in ring form by protection optical paths.

Incidentally, the optical network according to the embodiment 1 does not originally depend on the number of nodes in principle. However, the present embodiment will be described by using a 4-node wavelength division multiplexing survival network for ease of illustration.

The wavelength division multiplexing survival network comprises transmission equipment 11 through 14, optical fibers 15 through 18, optical branch-insert equipment (commonly called optical path add-drop multiplexers) 21 through 24, protection optical paths 31 through 34, and working optical paths 41, 42, 44-1 and 44-2.

Each of the transmission equipment 11 through 14 has an optical path transmit-receive unit and an optical path branching and inserting (add-drop) function. Each transmission equipment has the ability to perform optical-path switching, based on this function. This switching is done by a path switching units 4. In FIG. 4, the optical paths indicate bidirectional optical paths respectively. Since, however, the same optical fiber is utilized in the present example, the bidirectional optical paths make use of different optical wavelengths.

The wavelength division multiplexing survival network is connected in ring form by the protection optical paths 31 through 34 through the optical path add-drop functions. The working optical path 41 is terminated by the transmission equipment 11 and 12.

Each of the optical path add-drop equipment or multiplexers principally comprises a wavelength division multiplexer (WDM), an optical crossconnect, an optical repeater, an optical filter, an optical switch or optical circulator, etc. This corresponds to equipment capable of providing add (insertion: Add) and drop (branch: Drop) or through (pass: Through). For example, a signal transmitted from the transmission equipment 11 to the transmission equipment 12 through the working optical path 41 is first inserted into (added to) an optical path 41 in the optical path add-drop multiplexer 21. Further, the signal is allowed to branch off (drop) at the optical path add-drop multiplexer 22 through an optical path 14 on the optical fiber 15, followed by connection to the transmission equipment 12.

The working optical path 44-2 shown in FIG. 5 will be explained. The working optical path 44-2 transmits a traffic between the transmission equipment 11 and 13. In such a case, the working optical path 44-2 are connected to terminating sets or equipment in the transmission equipment 11 and 13 and optical path switching capacity or ability is provided within each transmission equipment. The optical fibers 17 and 18 are connected to each other through the optical path add-drop multiplexer 24. At this time, the working optical path 44-2 passes through the optical path add-drop multiplexer 24. Accordingly, the working optical path 44-2 and the transmission equipment 14 are not connected to each other.

A method of increasing optical paths will next be described. In the embodiment 1, the optical paths can be increased in number by simply providing sets or equipment for terminating a working optical path within transmission equipment in which traffics have increased.

Now consider where the traffics increase between the transmission equipment 11 and the transmission equipment 14. At this time, the provision of optical-path terminating sets or equipment within the transmission equipment 11 and 14 allows an increase in the working optical path as designated at numeral 44-1. Namely, it is unnecessary to additionally provide physical paths or lines. Incidentally, the optical path add-drop multiplexers 21 and 24 need the function of allowing each optical path to branch off and inserting it (adding and dropping it) as a matter of course.

Thus, the increase in working optical path makes it possible to increase transmission capacity without the need for an additional increase in optical fiber. Therefore, the present embodiment can reduce an add-on cost and is excellent in cost performance. When a plurality of optical paths are transmitted through a single optical fiber, the known wavelength division multiplexing technology (or frequency division multiplexing technology) is used.

[Method of Performing Switching Between Optical Paths]

An optical path switching method will next be described. This is a processing method used where a signal for the working optical path 41 is degraded (signal degrade) or brought to a malfunction (signal failure) due to a failure or fault resultant from a breakdown or the like in optical transmit-receive unit, for example.

In this case, the signal for the working optical path 41 is transmitted using a protection optical path. There are the following two choices as routes for the protection optical path used at this time. A first priority route is a route for the protection optical path 31 and a second priority route is a route corresponding to the protection optical paths 32–33–34. The former is normally called "span switching" and the latter is normally called "ring switching". It is necessary to determine in advance whether either of the two changeovers is preferentially selected. Priorities for the selection of the two switching routes are stored in the aforementioned wavelength address map.

The above-described overhead processing is performed by reference to the present wavelength address map so that the selection of the optical paths is done. The ring switching is set so as to make its attempt after the span switching has been attempted. The switching to the protection optical path 31 will be first done in the above-described example. If the protection optical path 31 is put out of action or unavailable due to the cutting or the like of the optical fiber 15, then the protection optical paths 32 through 34 are used to perform the ring switching.

When the protection optical paths are connected in ring form in this way, protection or spare routes extending in clockwise and counterclockwise directions can be selected, so that availability and the efficiency of healing can be improved.

Figure 6:
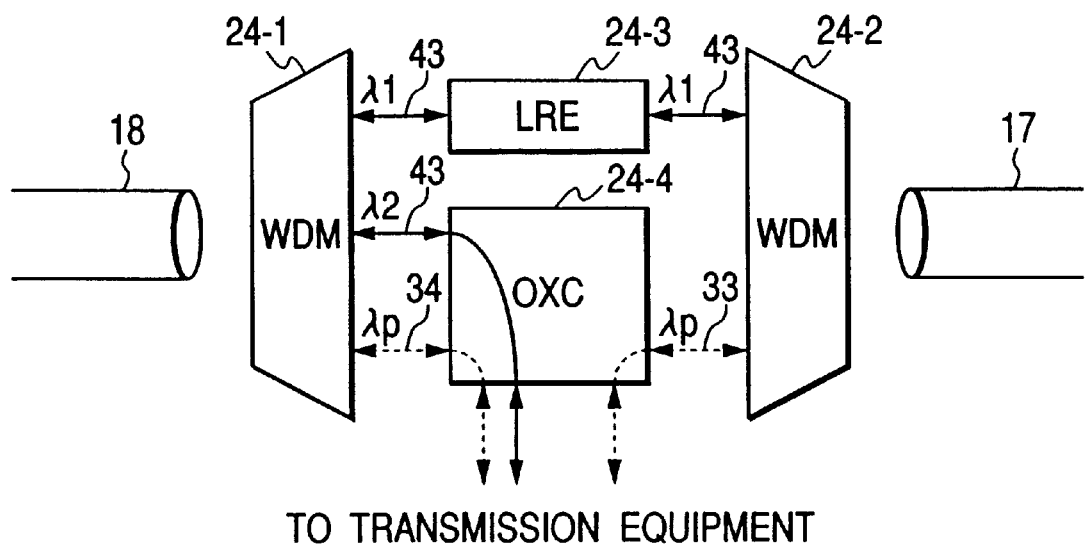
FIG. 6 is a diagram depicting an example of optical path add-drop multiplexer related to the present invention.

FIG. 6 is a diagram showing a specific example of the optical path add-drop multiplexer related to the present invention. FIG. 6 shows the application of the present invention to the optical path add-drop multiplexer 24 of FIG. 5 in particular. The present optical path add-drop multiplexer comprises wavelength division multiplexers 24-1 and 24-2, a repeater 24-3 and an optical crossconnect 24-4.

A working optical path 44-2 and a protection optical path 33 are sent to the optical fiber 17. The optical paths 43(λ1) and 33 are respectively connected to the repeater 24-3 and the optical crossconnect 24-4 through the wavelength division multiplexer 24-2. Working optical paths 43(λ2) and 43(λ1) and a protection optical path 34 are transmitted to the optical fiber 18. The optical paths 43(λ2), 43(λ1) and 34 pass through the wavelength division multiplexer 24-1. Thereafter, the optical path 43(λ1) is connected to the repeater 24-3, whereas the optical paths 43(λ2) and 34 are connected to the optical crossconnect 24-4. The optical paths 43(λ2), 33 and 34 are connected to the transmission equipment 14 through the optical crossconnect. In other words, the optical path 43(λ1) passes through the optical path add-drop multiplexer 24 and the optical paths 33, 34 and 43(λ2) branch off and are inserted (added and dropped) at the optical path add-drop multiplexer 24.

EMBODIMENT 2

Figure 7:
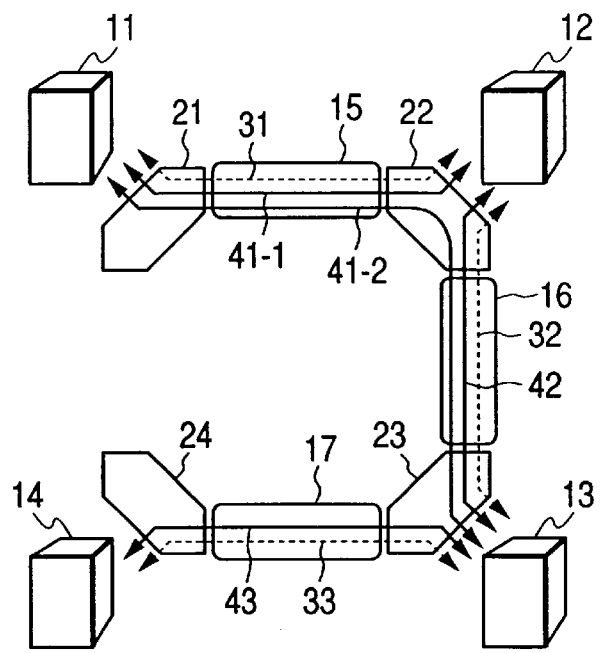
FIG. 7 is a diagram showing another example of the wavelength division multiplexing survival network of the present invention.

FIG. 7 is a diagram showing an embodiment 2 of a wavelength division multiplexing survival network according to the present invention. The present embodiment shows an example in which respective transmission equipment are connected to one another in a straight chain form by protection optical paths. Incidentally, the optical network according to the embodiment 2 does not originally depend on the number of nodes in principle.

The present wavelength division multiplexing survival network comprises transmission equipment 11 through 14, optical fibers 15 through 17, optical path add-drop multiplexers 21 through 24, protection optical paths 31 through 33, and working optical paths 41-1, 41-2, 42 and 43. A specific configuration of the optical path add-drop multiplexer is similar to that described in the embodiment 1. Each of the transmission equipment has an optical path transmit-receive unit and an optical path branching and inserting (add-drop) function. As a result, each transmission equipment has the ability to perform optical-path switching.

The wavelength division multiplexing survival network undergoes the add-drop functions of the respective transmission equipment within the respective transmission equipment and is connected in a straight chain form by the protection optical paths 31 through 33. When a failure occurs, the protection optical paths 31 and 32 are used as an alternative to the working optical path 41-2. Namely, the working optical path 41-2 shares the use of the working optical paths 41-1 and 42 and the protection optical paths 31 and 32. Thus, the sharing of the protection optical paths between a plurality of working optical paths allows a reduction in the cost of a protection system.Since other basic elements are similar to those employed in the embodiment 1, their description will be omitted.

EMBODIMENT 3

Figure 8:
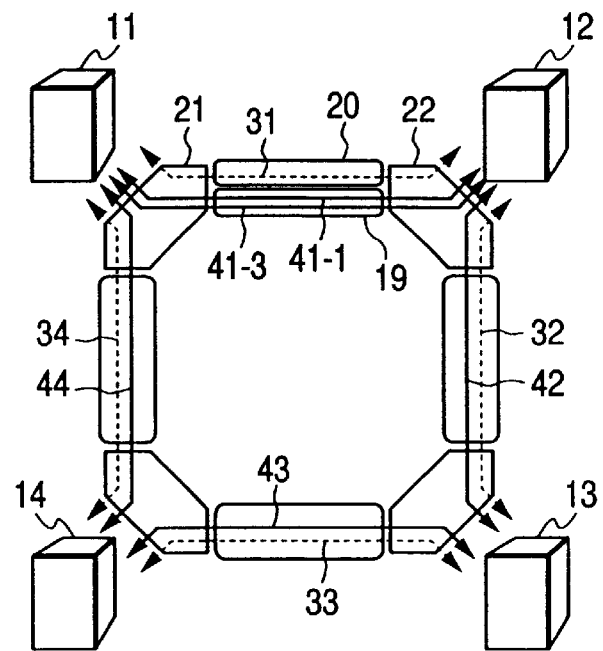
FIG. 8 is a diagram illustrating a further example of the wavelength division multiplexing survival network of the present invention.

FIG. 8 is a diagram showing an embodiment 3 of a wavelength division multiplexing survival network according to the present invention. In the present embodiment 3, two optical fibers are used to connect between transmission equipment 11 and 12.

The wavelength division multiplexing survival network comprises transmission equipment 11 through 14, optical fibers 16 through 20, optical path add-drop multiplexers 21 through 24, protection optical paths 31 through 34, and working optical paths 41-1, 41-3, 42, 43 and 44. The protection optical path 31 is connected via an optical fiber 20 and the working optical paths 41-1 and 41-3 are connected via an optical fiber 19. A specific configuration of each optical path add-drop multiplexer is similar to that described in the embodiment 1.

As described above, the wavelength division multiplexing survival network according to the present invention depends on only the form of connection of each optical path but does not depend on the form of connection of a physical medium such as an optical fiber. In other words, since it does not depend on the form of connection of each optical fiber, the already-existing optical fiber can be utilized without the need for additional installations or the like.

Now consider where a failure occurs in the optical fiber 19. When the optical fiber 19 is cut off, for example, the working optical paths 41-1 and 41-3 are also cut off. As one example of their healing, the following is considered: The protection optical path 31 is used to heal the working optical path 41-1 and the protection optical paths 32 through 34 are used to perform ring switching, thereby making it possible to heal the working optical path 41-3. Namely, if the protection optical paths and the working optical paths are transmitted through different optical fibers, the efficiency of healing of a failure such as cutoff of the optical fiber or the like is improved. Thus, the wavelength division multiplexing survival network according to the present invention is capable of constructing a network in consideration of the healing efficiency and provides flexibility for the construction of the network.

EMBODIMENT 4

Figure 9:
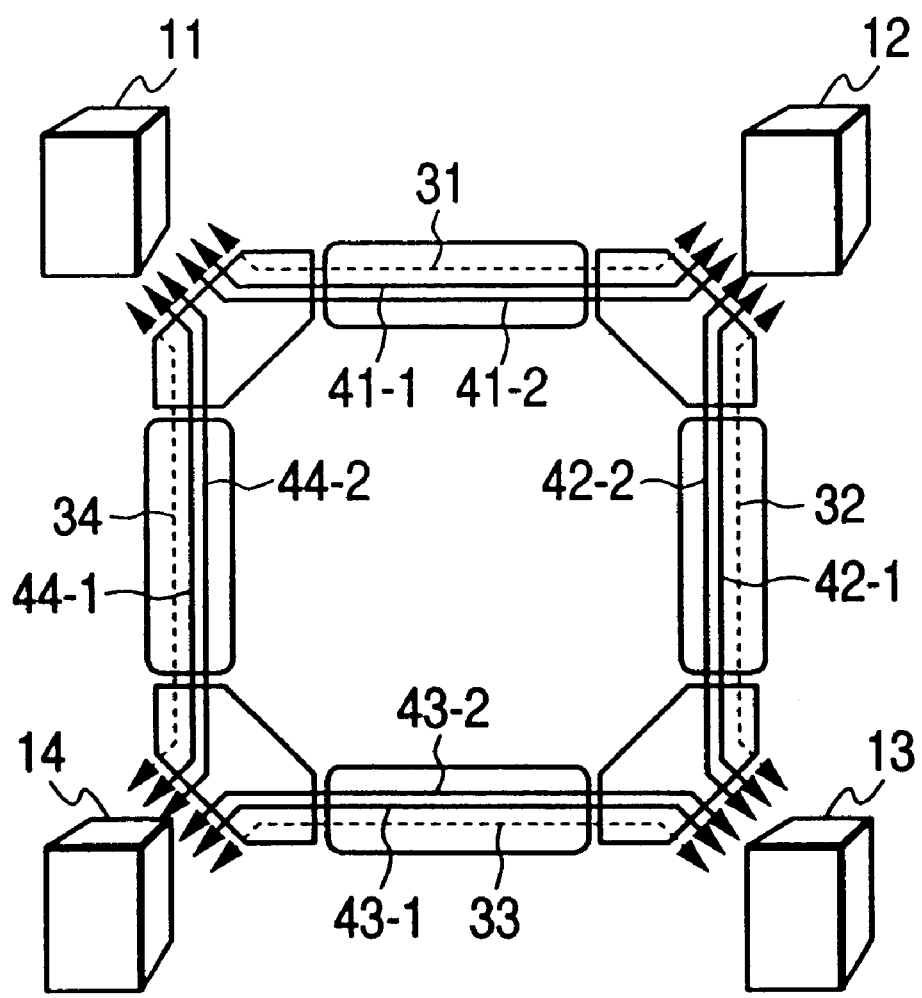
FIG. 9 is a diagram depicting a still further example of the wavelength division multiplexing survival network of the present invention.

FIG. 9 is a diagram showing an embodiment 4 of a wavelength division multiplexing survival network according to the present invention. The embodiment 4 corresponds to an example in which respective transmission equipment are connected to one another in ring form.

The wavelength division multiplexing survival network comprises transmission equipment 11 through 14, optical fibers 15 through 18, optical path add-drop multiplexers 21 through 24, protection optical paths 31 through 34, and working optical paths 41-1, 41-2, 42-1, 42-2, 43-1, 43-2, 44-1 and 44-2.

In the embodiment 4, the working optical paths 41-1, 42-1, 43-1 and 44-1 are connected in a ring form through the transmission equipment 11 through 14. Similarly, the working optical paths 41-2, 42-2, 43-2 and 44-2 are also connected in a ring form through the transmission equipment 11 through 14. Thus, the ring network can be constructed by the working optical paths. In the present embodiment, the two ring networks are formed by the working optical paths. The respective working optical paths are transmitted between the respective transmission equipment through the use of the same optical fiber. Further, the respective ring networks can be also designed so that the working optical paths are transmitted by different optical fibers.

[a. Optical Path Switching System]

An optical path switching system for implementing optical-path switching will next be described using the present embodiment. Digital transmission is normally done in frame units and the overhead of each transmission frame is standardized by the synchronous digital hierarchy (SDH) or synchronous optical network (SONET) or the like. An automatic protection switching byte (APS byte) lying within the overhead is assigned for automatic switching control. The APS byte has two bytes: so-called [K1 byte] and [K2 byte].

When switching is done by the present wavelength division multiplexing survival network, it is necessary to transmit switching information including failure states of optical paths, wavelength address information thereof and information about switched states. The specific contents of the switching information may include at least [significance or importance of failure], [optical path number], [transmit node number] and [switched state]. The [significance of failure] corresponds to information about the failure state of each optical path. The [optical path number] and [transmit node number] respectively correspond to the wavelength address information of each optical path. The [switched state] corresponds to the information about the switched state of each transmission equipment. [Type of signal] will be defined to allow more flexible switching.

The [significance of failure] indicates a priority for switching between the optical paths, which determined from the significance of traffics, and the degree of deterioration in signal based on the measurement of an error rate, etc. When failures occur in a plurality of optical paths, the switching priority is used to determine the significance. The [optical path number] indicates information for discriminating between the working optical path and the protection optical path. The [transmit node number] indicates information indicative of a node (optical transmission equipment) which has sent switching information therefrom. The [switched state] indicates information indicative of a switched state of the node having sent the switching information. The [type of signal] indicates information indicative of a trigger used for a switching start or a signal for performing only information transfer for purpose of a switching start. The K1 and K2 bytes transmitted through the protection optical paths are used for communications of such switching information.

[b. Example of Use of APS Byte]

An example of the use of the APS byte will next be explained.

FIG. 4 is a diagram showing an example of the use of the APS byte employed in the present invention. The drawing shows an example in which switching information is assigned to the APS byte. For instance, the [significance of failure] and [optical path number] are assigned to the K1 byte. They are assigned thereto by four bits respectively. The [transmit node number], [type of signal] and [switched state] are assigned to the K2 byte. They are assigned thereto by four bits respectively. When they are respectively assigned thereto in this way, 16 types of failure states, the number of optical paths corresponding to 16 paths (protection optical path: 1 and working optical paths corresponding to it: 15), the number of nodes corresponding to 16 nodes, two types of signals, and eight types of switched states can be assigned to the bytes.

[c. How to Allocate Wavelength Addresses]

FIG. 11 is a diagram for describing the way to assign wavelength addresses related to the present invention. A configuration of an optical network is similar to that shown in FIG. 5.

A wavelength address map includes numbers of respective optical paths, states of connecting nodes, a first priority protection optical path and a second priority protection optical path as described with reference to FIG. 10. The optical path number depends on only the state of connection of each transmission equipment but does not depend on the wavelength and the state of connection of an optical fiber, etc. When the working optical path makes use of the same protection optical path, it is necessary to allocate optical path numbers so as not to overlap. The first priority protection optical path corresponds to an optical path to be firstly switched when it is desired to heal a working optical path in which a failure occurs. When the first priority protection optical path cannot be used, an attempt to perform switching to the second priority protection optical path is made.

It is necessary to store these information in wavelength address maps lying within respective transmission equipment upon construction of a network. For example, a working optical path 41 is assigned an optical path number of [1], a connecting node [AB], a first priority protection optical path [AB], and a second priority protection optical path [ABCD]. Since a working optical path 44-2 shares the use of a protection optical path 34, a working path 41-1 is assigned an optical path number [2].

A method of utilizing the wavelength address map will next be described.

When a failure occurs in the optical path 41 in a state shown in FIG. 11, for example, switching information is transferred or communicated between the transmission equipment A and B to thereby determine a switching route. At this time, switching to a first priority protection optical path 31 is first done according to the wavelength address map. As a result, the protection optical path 31 is used if the switching is allowed. If the switching is not permitted, in other words, when the protection optical path 31 is already used, or a failure occurs in the protection optical path 31 and hence the protection optical path 31 is unavailable, an attempt to perform switching to the second priority protection optical paths 32, 33 and 34, which is connecting between the transmission equipment A, B, C and D, is made.

At this time, the wavelength address map is renewed in the following manner. An optical path number [1] indicative of the optical path 41 and the state of the connecting node [AB] are changed to a [signal failure] When the first priority protection optical path 31 is used upon restoration of the failure, the state of the first priority protection optical path for the optical path 41 results in [ccupied]. Thus, all the protection optical paths for which the optical path 31 is used, are changed to [unavailable]. In FIG. 11, the renewal of data in the wavelength address map in the present example is illustrated as [before change in data in wavelength address map] and [after change in data in wavelength address map], for instance.

[d. Treating process of APS byte]

Figure 12:
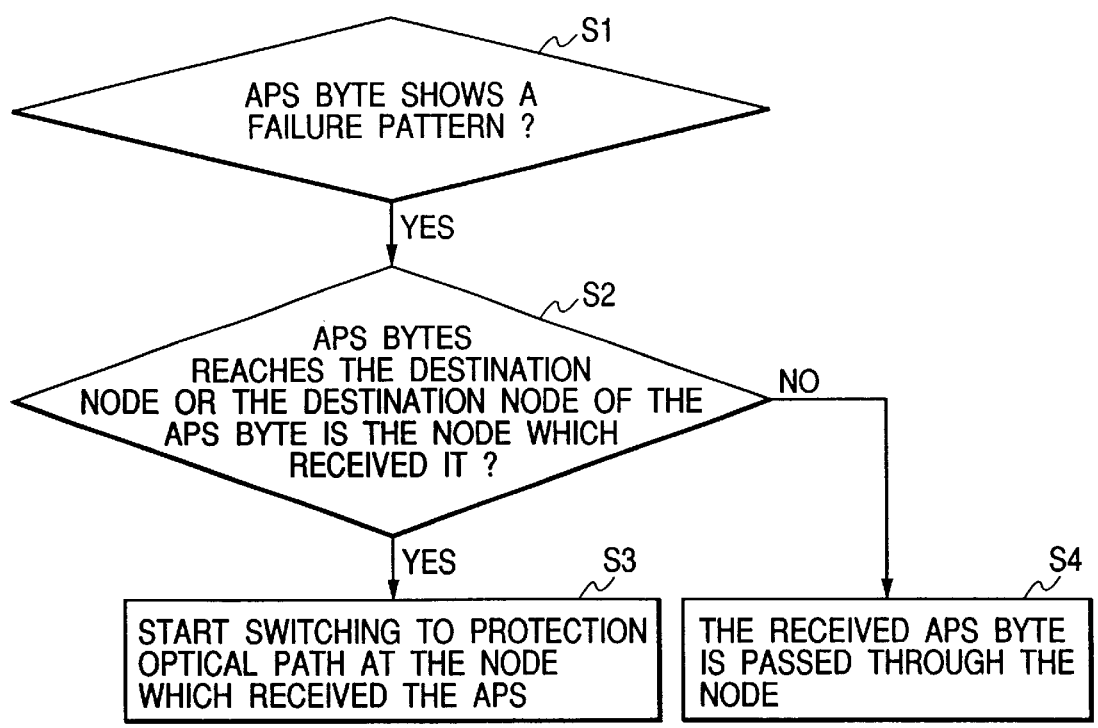
FIG. 12 is a diagram for describing the process of handling an APS byte employed in the present invention through a flowchart.

FIG. 12 is a flowchart for describing a process for treating an APS byte employed in the present invention.

1. Transmission equipment having detected a failure determines whether the APS byte is a pattern indicative of failure information (S1).

2. When it shows the failure pattern, the transmission equipment makes a decision as to whether or not the APS byte is destined for its own transmission equipment (S2).

3. When the answer is found to be YES in S2, the transmission equipment starts switching to a protection optical path (S3). When the answer is found to be NO in S2, the transmission equipment transfers the APS byte to transmission equipment adjacent thereto by way of the protection optical path (S4).

4. The control means 3 performs these decisions while referring to a wavelength address map.

A description will be made of the exchange of an APS signal between transmission equipment.

Figure 13:
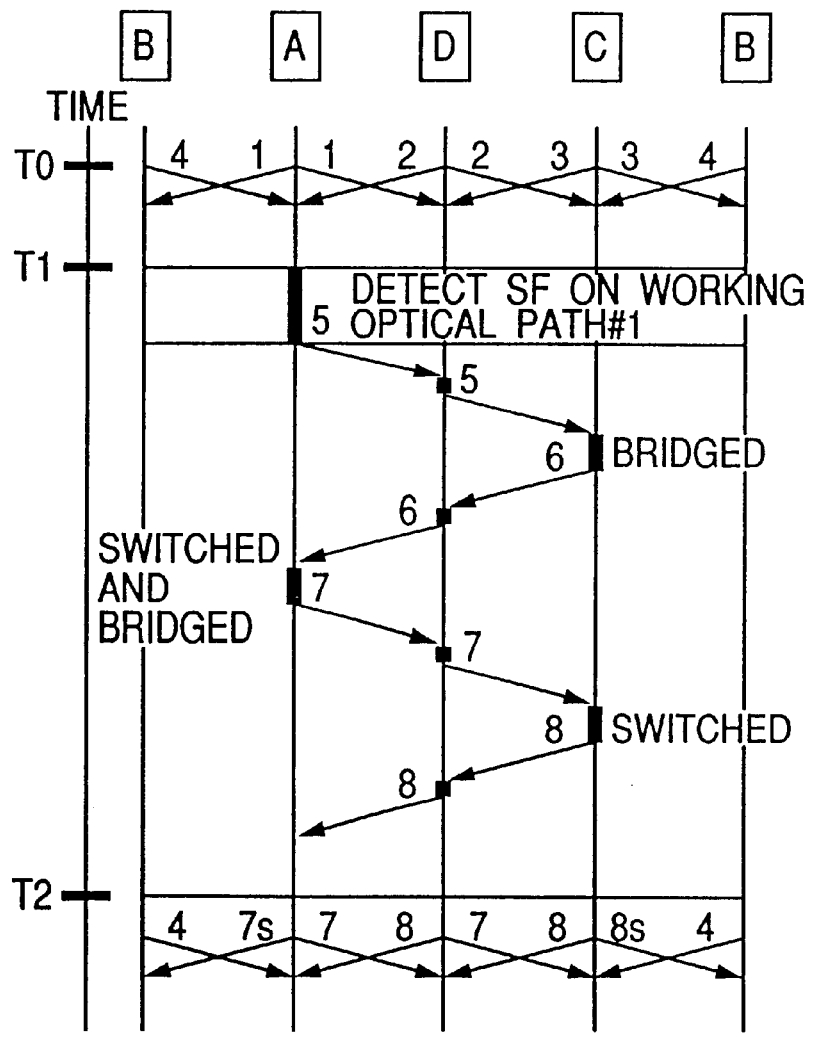
FIG. 13 is a diagram showing an example of a timing chart for an APS byte employed in the present invention.

FIG. 13 is a diagram showing an example of a timing chart for the APS byte employed in the present invention.

A description will now be made of an example of a failure in the working optical path 44-2 shown in FIG. 10 by way of example.

Firstly, signals 1 through 4 indicate a steady state of a failure at time T0. [#0] indicates a protection optical path and [NR] indicates a normal state. [S] indicates a signal other than a switching trigger. [idle] indicates a state free of switching. These are represented as signals 1, 2, 3 and 4 of K1 and K2 bytes shown in FIG. 13. Signs or marks respectively corresponding to numerals indicative of transmit signals in the timing chart shown in FIG. 13 are respectively given to the K1 and K2 bytes.

1. Now consider where transmission equipment A has detected [SF] indicative of a failure of the working optical path 44-2 at time T1. The term [SF] is a failure state in which a switching priority has been determined as high as a result of the determination of a failure by a bit error rate (abbreviated as BER) measurement or the like. The node A having detected the failure transmits switching information including a failure state, wavelength address information and a switched state to nodes B and D adjacent thereto (signal 5). At this time, the node A sends a serious failure [SF] as the failure state, and transmits [r/idle] indicative of a switching request as wavelength address information according to an optical path number [1], a transmission node [A], a combination of the type of signal and a switched state.

The node D having received the switching information first determines the switching information as being a failure pattern (This decision corresponds to S1 in the flowchart shown in FIG. 12 and is similar subsequently).

2. A decision is next made as to a node to receive the switching information by reference to a wavelength address map held by each transmission equipment (S2).

3. Since the node to receive the switching information is found to be C from the result of decision, it is transferred to an adjacent node C (S4).

4. Further, the node C having received the switching information makes a decision about the failure pattern (S1) and thereafter determines the destination node as a node which received it, by reference to the wavelength address map (S3). As a result, the switching to a route ADC corresponding to a first priority protection optical path, i.e., protection optical paths 33 and 34 is started (S3).

5. The node C transmits a serious failure [SF] as a failure state and sends [r/Br] indicative of a switching response as wavelength address information according to an optical path number [1], a transmission node [C], a combination of the type of signal and a switched state (signal 6).

6. The node A, which has received the switching response, makes the completion of switching and sends [r/S&B] indicative of the completion of switching to the node C according to the combination of the type of signal and the switched state (signal 7).

7. The node C, which has received the completion of switching, also terminates switching and transmits the gist thereof to the node A (signal 8).

Since the failure information is sent even to the transmission equipment B irrelevant to the switching, the nodes A and C send [s/S&B] indicative of information transmission according to the combination of the type of signal and the switched state (signals 7s and 8s). The node B having received this signal updates the information in the wavelength address map. This makes it possible to perform a high-speed switching decision when a failure is newly developed, for example, thereby shortening a switching time interval.

Time T2 indicates an APS signal at the time that the working optical path 44-2 is healing a traffic through the use of the protection optical paths 33 and 34.

The optical network according to the invention of the present application can provide a self-healing optical network capable of flexibly selecting protection optical paths upon the occurrence of a failure without depending on the form of installation of an optical transmission line, e.g., an optical fiber.

The optical network according to the invention of the present application is capable of improving the efficiency of use of an optical transmission line, e.g., an optical fiber employed therein.

Namely, since the optical network according to the invention of the present application is not affected by the installation form, optical paths can be flexibly strung according to the capacity of a traffic. As a result, the efficiency of usage of the optical fiber can be improved and the installation of repeaters by through nodes allows flexible construction of a network. Further, the network can be reduced in cost. It is also possible to cause the selection of the protection optical paths at the failure to have flexibility and perform high-speed switching.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An optical network, comprising at least:
   a plurality of pieces of transmission equipment having switching information; and
   a plurality of optical paths which connect said plurality of pieces of transmission equipment to one another;
   wherein said optical paths are used as working optical paths or protection optical paths,
   and wavelengths of predetermined transmission light are assigned to said optical paths to perform wavelength division multiplexing digital transmission, and
   said plurality of optical paths have optical paths which connect said plurality of pieces of transmission equipment in a straight chain form, and
   wherein the switching information includes at least numbers of working optical paths highest in importance, numbers of transmission equipment which transmitted the switching information, and switched states of the transmission equipment.

2. The optical network according to claim 1, further including at least optical paths connecting said transmission equipment in a ring form and wherein said optical paths are capable of being used as protection optical paths.

3. The optical network according to claim 1, further including at least optical paths connecting said transmission equipment in a straight chain form, and wherein said optical paths are capable of being used as protection optical paths.

4. The optical network according to claim 1,
   wherein a ring network constructed by said working optical paths is provided at least two.

5. The optical network according to claim 2, wherein said optical paths connect a plurality of said transmission equipment in form of mesh-like and said optical paths are served as a working line.

6. The optical network according to claim 3,
wherein said optical paths connect plurality of said transmission equipments in form of mesh-like and said optical paths are served as a working line.

7. The optical network according to claim 1,
wherein the switching information includes at least wavelength addresses for working optical paths and switched states of transmission equipment.

8. The optical network according to claim 1,
wherein the switching information includes at least wavelength addresses for working optical paths highest in importance and switching states of transmission equipment.

9. The optical network according to claim 1, wherein each transmission equipment has memory means constituting a wavelength address map for storing therein at least information of wavelength addresses on said respective optical paths and failure information on said respective optical paths, and is constructed such that when a failure occurs in a working optical path, optical-path switching is done based on switching control information about the failure, the wavelength address information and the failure information on the optical paths and the switching control information includes a determination concerning an automatic protection switching byte of overhead information.

10. A time-division multiplex transmission optical network, comprising at least:
a plurality of pieces of transmission equipment having switching information; and
a plurality of optical paths which connect said plurality of pieces of transmission equipment to one another;
wherein said optical paths are used as working optical paths or protection optical paths,
and said plurality of optical paths are assigned predetermined time division multiplex signals and at least a transmission frame having overhead information is used to perform digital transmission, and
said plurality of optical paths include optical paths which connect said plurality of pieces of transmission equipment in a straight chain form;
wherein the switching information includes at least numbers of working optical paths highest in importance, numbers of transmission equipment which transmitted the switching information, and switched states of the transmission equipment.

11. The optical network according to claim 10, further including at least optical paths connecting said plurality of pieces of transmission equipment in a ring form, and wherein said optical paths are capable of being used as protection optical paths.

12. The optical network according to claim 10, further including at least optical paths connecting said plurality of pieces of transmission equipment in a straight chain form, and wherein said optical paths are capable of being used as protection optical paths.

13. The optical network according to claim 10, wherein a ring network constructed by said working optical paths is provided at least two.

14. The optical network according to claim 11,
wherein said optical paths connect plurality of said transmission equipments in form of mesh-like and said optical paths are served as a working line.

15. The optical network according to claim 12,
wherein said optical paths connect plurality of said transmission equipments in form of mesh-like and said optical paths are served as a working line.

16. A wavelength division multiplexing optical network, comprising at least:
a plurality of pieces of transmission equipment having switching information; and
optical paths which connect said plurality of pieces of transmission equipment to one another;
wherein said optical paths are assigned wavelengths of predetermined transmission light and at least a transmission frame having overhead information is used to perform digital transmission,
said overhead information has switching control information about a failure, and
said each transmission equipment has memory means constituting a wavelength address map for storing therein at least information of wavelength addresses on said respective optical paths and failure information on said respective optical paths, and is constructed such that when a failure occurs in a working optical path, optical-path switching is done based on the switching control information about the failure, the wavelength address information and the failure information on the optical paths;
wherein the switching information includes at least numbers of working optical paths highest in importance, numbers of transmission equipment which transmitted the switching information, and switched states of the transmission equipment.

17. A wavelength division multiplexing optical network, comprising at least:
a plurality of pieces of transmission equipment having switching information; and
optical paths which connect said plurality of pieces of transmission equipment to one another;
wherein said optical paths are used as working optical paths or protection optical paths and are assigned wavelengths of predetermined transmission light, and at least a transmission frame having overhead information is used to perform digital transmission,
said overhead information has switching control information about a failure, and
said each transmission equipment has memory means constituting a wavelength address map for storing therein at least information of wavelength addresses on said respective optical paths and failure information on said respective optical paths, and is constructed such that when a failure occurs in a working optical path, the working optical path is switched to a protection optical path, based on the switching control information about the failure, the wavelength address information and the failure information on the optical paths;
wherein the switching information includes at least numbers of working optical paths highest in importance, numbers of transmission equipment which transmitted the switching information, and switched states of the transmission equipment.

18. The optical network according to claim 16 or 17, which is a SONET (Synchronous Optical Network) network.

19. The optical network according to claim 16 or 17, further including at least optical paths connecting said transmission equipment in a ring form, and wherein said optical paths are capable of being used as protection optical paths.

20. The optical network according to claim 16, further including at least two optical paths connecting said transmission equipment in a straight chain form, and wherein said optical paths are capable of being used as protection optical paths.

21. The optical network according to claim 16 or 17, wherein the two or more of said optical paths are placed in one optical transmission line.

22. The optical network according to claim 16 or 17, wherein a ring network constructed by said working optical paths is provided at least two.

23. The optical network according to claim 19,
wherein said optical paths connect plurality of said transmission equipments in form of mesh-like and said optical paths are served as a working line.

24. The optical network according to claim 20,
wherein said optical paths connect plurality of said transmission equipments in form of mesh-like and said optical paths are served as a working line.

25. The optical network according to claim 16, wherein the switching control information includes a determination concerning an automatic protection switching byte of the overhead information.

26. The optical network according to claim 16 or 17, which is a SDH (Synchronous Digital Hierarchy) network.

27. An optical network, comprising at least:
a plurality of pieces of transmission equipment having switching information; and
a plurality of optical paths which connect said plurality of pieces of transmission equipment to one another;
wherein at least two of said optical paths are placed in one optical transmission line and at least a transmission frame having overhead information is used to perform digital transmission, thereby allowing signal multiplexing transmission, and
said plurality of optical paths include a plurality of optical paths connecting said plurality of pieces of transmission equipment in a straight chain form;
wherein the switching information includes at least numbers of working optical paths highest in importance, numbers of transmission equipment which transmitted the switching information, and switched states of the transmission equipment.

28. A wavelength division multiplexing survival network, comprising at least:
several pieces of transmission equipment having switching information;
working optical paths which connect said transmission equipment to one another and are assigned optical wavelengths; and
protection optical paths which connect said transmission equipment and are assigned optical wavelengths;
wherein said each transmission equipment has memory means constituting a wavelength address map for storing therein at least information of wavelength addresses and failure information on said respective optical paths, and performs digital transmission by using at least a transmission frame having overhead information;
wherein the switching information includes at least numbers of working optical paths highest in importance numbers of transmission equipment which transmitted the switching information, and switched states of the transmission equipment; and
wherein said network is constructed so as to be capable of performing the following switching determining steps:
(1) a step 1 for determining whether an automatic protection switching byte of said overhead information shows a failure pattern,
(2) a step 2 for determining whether the automatic protection switching byte of said overhead information is destined for the transmission equipment which received the same,
(3) a step 3 for starting a switching operation when the automatic protection switching byte is destined for the transmission equipment which received the same, and
(4) a step 4 for transferring the automatic protection switching byte when the automatic protection switching byte is undestined for the transmission equipment which received the same.

* * * * *